United States Patent [19]

Brady

[11] 4,115,344
[45] Sep. 19, 1978

[54] MOLD CORROSION INHIBITION IN POLY(ARYLENE) SULFIDE PROCESSING

[75] Inventor: Donnie G. Brady, Bartlesville, Okla.

[73] Assignee: Phillips Petroleum Company, Bartlesvile, Okla.

[21] Appl. No.: 813,061

[22] Filed: Jul. 5, 1977

[51] Int. Cl.$^2$ .......................... C08K 5/34; C08K 5/22; C08K 5/24; C08K 5/21; C08K 5/16
[52] U.S. Cl. ........................ 260/37 R; 260/45.85 A; 260/45.8 NT; 260/45.8 N; 260/45.9 NN; 260/45.9 NC
[58] Field of Search .................. 260/79, 79.1, 45.9, 260/37 R, 45.85 A, 45.8 NT, 45.8 N; 264/83, 331; 252/390, 394

[56] References Cited

U.S. PATENT DOCUMENTS

| | | | |
|---|---|---|---|
| 2,583,370 | 1/1952 | Goppel et al. | 260/45.9 R |
| 2,654,679 | 10/1953 | Goppel et al. | 260/45.9 R |
| 3,248,325 | 4/1966 | Graham | 260/79 |
| 3,386,950 | 6/1968 | Horvath et al. | 260/79 |
| 3,407,182 | 10/1968 | Hinton | 260/79 |
| 3,408,342 | 10/1968 | Horvath et al. | 260/45.9 |
| 3,879,355 | 4/1975 | Blackwell | 260/79 |
| 4,017,450 | 4/1977 | Bailey | 260/37 R |
| 4,026,664 | 5/1977 | Noack | 252/390 |

OTHER PUBLICATIONS

Polymer Engineering and Science, Dec. 1976, vol. 16, No. 12, pp. 831 to 835 — article by Hill et Brady.

*Primary Examiner*—V. P. Hoke

[57] ABSTRACT

The tendency of poly(arylene sulfide) resin to cause mold corrosion upon molding is inhibited by admixing with said poly(arylene sulfide) resin prior to the molding thereof a suitable amount of ammonia precursor.

24 Claims, No Drawings

MOLD CORROSION INHIBITION IN POLY(ARYLENE) SULFIDE PROCESSING

This invention relates to poly(arylene sulfide) resin compositions. In another aspect this invention relates to a method for inhibiting the tendency of molten poly(arylene sulfide) resin to cause metal in contact therewith to corrode. In a further aspect, this invention relates to a method for at least substantially eliminating the tendency of poly(arylene sulfide) resin to cause corrosion of the molds employed in molding processes.

Poly(arylene sulfide) resin engineering thermoplastics having outstanding ability to withstand high temperatures and chemical attack are commercially available. Occasionally during the injection molding of poly(arylene sulfide) resins mold corrosion has been noted. The corrosion, when observed, has varied from only a slight attack of the mold after extensive molding to very extensive damage after molding for only a short time. Thus means of combatting the corrosion problem would be beneficial for the development of the poly(arylene sulfide) resin technology.

Accordingly, an object of the present invention is to provide a method for reducing the possibility of mold corrosion during the molding of poly(arylene sulfide) resins.

A further object is to provide a novel poly(arylene sulfide) resin molding composition.

Other objects, advantages, and features of this invention will be apparent to those skilled in the art upon reading the following description, examples, and appended claims.

In accordance with this invention, an ammonia precursor is incorporated in a composition comprising an arylene sulfide polymer to inhibit or prevent corrosion in the mold during injection molding of the composition.

The term ammonia precursor as used in this disclosure denotes those nitrogen-containing compounds which decompose to release ammonia at temperatures during which the poly(arylene sulfide) resin tends to cause mold corrosion.

The present invention can be applied to any normally solid poly(arylene sulfide) resins, whether linear, branched, or lightly crosslinked. The invention can be used, for example, with poly(arylene sulfide) resins prepared as described in U.S. Pat. No. 2,513,188 wherein polyhalo aromatic compounds are reacted with sulfur and metal sulfide at the fusion temperature. It can also be used with resins manufactured by the method described in British Pat. No. 962,941 wherein metal salts of halothiophenols are heated at a polymerizing temperature. The invention is particularly useful with polymers prepared by the solution reaction of polyhalo compounds with alkali metal sulfides as described in U.S. Pat. No. 3,354,129. If it is desired to employ poly(arylene sulfide) resins of lower melt flow than those obtained through the process of the just previously mentioned patent, the polymers obtained in that process can be modified, e.g., according to the method disclosed in U.S. Pat. No. 3,699,087 or that disclosed in U.S. Pat. No. 3,717,620. The present invention can also be used upon p-phenylene sulfide polymers prepared as described in U.S. Pat. No. 3,919,177, wherein p-phenylene sulfide polymers are produced by reacting at least one p-dihalobenzene with a mixture in which at least one suitable source of sulfur, at least one alkali metal carboxylate, and at least one organic amide are contacted. Since the techniques of producing poly(arylene sulfide) resins disclosed in the above-mentioned patents are now known to those skilled in the art, further description of those processes will not be set forth herein. For more detail one may refer to the specific patents, which are incorporated herein by reference.

The present invention is particularly useful for molding grade poly(arylene sulfide) resins. Generally such poly(arylene sulfide) resins have melting points in the range of about 280° C to about 400° C. The melt flow of such poly(arylene sulfide) resin, determined by the method of ASTM D 1238-70, modified to a temperature of 316° C using a 5-kg weight, generaly will be within the range of about 0.5 to about 250, preferably about 20 to about 50, g/10 min.

The present invention is particularly useful for the poly(arylene sulfide) resins which are linear, branched, or lightly crosslinked poly(phenylene sulfide) resins. Molding grade poly(phenylene sulfide) resins can be molded into a variety of useful articles by molding techniques which are known in the art. Molding should be carried out generally above the melting point or softening point but below the decomposition point of the particular polymer being molded. Suitable molding techniques include injection molding, compression molding, vacuum molding, extrusion and the like. While the present invention is particularly suitable for preventing corrosion that occurs when poly(phenylene sulfide) resins are injection molded, it is considered that the invention will substantially eliminate corrosion that occurs as a result of any technique involving contacting of metal with molten poly(arylene sulfide) resins.

Preferably the ammonia precursor has from 0 to about 8 carbon atoms. Examples of some suitable ammonia precursors include unsubstituted and monohydrocarbyl-substituted ureas, e.g., urea, methylurea, isopropylurea, heptylurea, cyclohexylurea, phenylurea, and p-tolylurea; unsubstituted and monohydrocarbyl-substituted hydrazines, e.g., hydrazine, methylhydrazine, isobutylhydrazine, octylhydrazine, cyclopentylhydrazine, phenylhydrazine, and m-tolylhydrazine; dicarboxamides such as succinamide and phthalamide; carbamate esters such as methyl carbamate, ethyl carbamate, isobutyl carbamate, heptyl carbamate, cyclohexyl carbamate, phenyl carbamate, and o-tolyl carbamate; amino acids such as glycine, alanine, and histidine; melamine; biuret; guanidine; and the like; and mixtures thereof. Urea and monohydrocarbylsubstituted urea are the ammonia precursors now presently preferred. Urea is especially preferred.

In accordance with this invention, the amount of suitable ammonia precursor combined with the poly(arylene sulfide) resin is any amount which is sufficient to reduce the tendency of the poly(arylene sulfide) resin to cause metal corrosion. Generally, the weight ratio of ammonia precursor to poly(arylene sulfide) resin is in the range of about 0.08 to 100 to about 3 to 100, preferably in the range of about 0.15 to 100 to about 0.8 to 100.

The ammonia precursor can be incorporated in the poly(arylene sulfide) resin by any suitable technique which results in a composition comprising poly(arylene sulfide) resin and a suitable amount of ammonia precursor. A presently preferred procedure for preparing the poly(arylene sulfide) resin composition comprises impregnating the poly(arylene sulfide) resin with a solution of urea in a suitable volatile solvent, followed by evaporation of the solvent.

Like other poly(arylene sulfide) resin compositions, the resin compositions of this invention have utility in uses where high melting point and high temperature stability are desirable. The poly(arylene sulfide) resins of this invention can also include other additives such as fillers, pigments, stabilizers, softeners, extenders, and other polymers. In injection molding, for example, it is quite common to prepare poly(arylene sulfide) resin compositions containing about 20 to about 50 weight percent of conventional glass fiber filler, based on the weight of the poly(arylene sulfide) resin and the glass fiber filler. Generally glass fibers about ¼ inch to about 2 inches in length are employed. Also, as known in the art, such glass-filled compositions can be prepared by feeding continuous glass roving through an extruder along with the thermoplastic. Of course, it would be counterproductive to employ an additive which increases the corrosion tendency of the present inventive composition.

Not only is corrosion of the mold inhibited or prevented by use of the ammonia precursor, but the off gases are rendered less acidic and even can be made neutral or basic. Very importantly, when the composition comprising the arylene sulfide polymer and ammonia precursor is molded, the properties, including the mechanical and electrical properties, e.g., insulation resistance, of the molded product are substantially the same as those of the composition molded without use of the ammonia precursor. The retention of high insulation resistance is particularly important in applications where good electrical insulation is needed, e.g., in electrical connectors, circuit boards, and the like.

The present invention and its advantages will be further demonstrated by the following examples.

EXAMPLES

In the following examples, the glass-filled, partially cured poly(p-phenylene sulfide) (PPS) pellets were prepared by pelletizing a mixture of 40 parts by weight glass fibers and 60 parts by weight partially cured PPS. The partially cured PPS, which had a melt flow within the range of 20 to 50 g/10 min. (ASTM D 1238-70, modified to a temperature of 316° C using a 5-kg weight), was produced by heating uncured PPS in air at approximately 246° C until the melt flow was reduced to the desired level. The uncured PPS was prepared by reacting p-dichlorobenzene and sodium sulfide in the presence of N-methyl-2-pyrrolidone.

EXAMPLE I

A composition (1:100 Composition) consisting of urea and glass-filled, partially cured PPS (Composition without Urea) in a weight ratio of 1:100, respectively, was prepared by adding 100 g of glass-filled, partially cured PPS pellets to a solution of 1.0 g of urea in 50 ml of water, followed by removal of water by heating the mixture under reduced pressure on a hot water bath. Compositions consisting of urea and glass-filled, partially cured PPS in weight ratios of 0.5:100 (0.5:100 Composition) and 0.25:100 (0.25:100 Composition) were prepared in like manner except that urea was used in amounts of 0.5 g and 0.25 g, respectively, instead of 1.0 g. Samples of the urea-treated pellets and the untreated, glass-filled, partially cured PPS pellets were heated in a small stream of preheated air, and the acidity or basicity of the exit gas was determined after the samples were heated for 3, 5, 10, 20, and 30 minutes by allowing the exit gas to contact pH paper wetted with water. The results are shown in Table I.

TABLE I

| | Heating Time, minutes | | | | |
|---|---|---|---|---|---|
| | 3 | 5 | 10 | 20 | 30 |
| Composition without Urea | | | | | |
| Temperature of Sample, °C | 280 | 300 | 345 | 360 | 335 |
| Reaction Shown by pH Paper | Neutral | Neutral | Neutral | Acidic | Acidic |
| 1:100 Composition | | | | | |
| Temperature of Sample, °C | 280 | 300 | 350 | 370 | 335 |
| Reaction Shown by pH Paper | Basic | Basic | Basic | Basic | Basic |
| 0.5:100 Composition | | | | | |
| Temperature of Sample, °C | 255 | 270 | 305 | 355 | 350 |
| Reaction Shown by pH Paper | Basic | Basic | Basic | Basic | Neutral |
| 0.25:100 Composition | | | | | |
| Temperature of Sample, °C | 255 | 270 | 305 | 350 | 350 |
| Reaction Shown by pH Paper | Basic | Basic | Basic | Basic | Acidic |

Thus, when the composition containing no urea was heated for 20 minutes or longer, the exit gas was acidic. In contrast, when the 1:100 Composition, prepared from 1.0 g of urea and 100 g of glass-filled, partially cured PPS pellets, was heated for 30 minutes, the exit gas was still basic. When the compositions of lower urea content were heated, the exit gases were still basic after 20 minutes; in one instance the exit gas was neutral after 30 minutes, and in the other instance it was acidic after 30 minutes. Thus, acidity in the off gas from the heated samples was inhibited or prevented by the presence of urea in the samples.

EXAMPLE II

A composition consisting of urea and glass-filled, partially cured PPS in a weight ratio of 0.5:100, respectively, was prepared in the following manner. To a solution of 22.6 g of urea in 500 ml of water was added 1 lb. (454 g) of glass-filled, partially cured PPS pellets, and water was removed by heating the mixture under reduced pressure on a hot water bath. After drying overnight at 100° C, the resulting pellets were mixed with 9 lb. (4082 g) of glass-filled, partially cured PPS pellets.

Specimens of the above composition, as well as of the glass-filled, partially cured PPS from which the above composition was prepared, were injection molded with a New Britain Model 75B injection molder, using a stock temperature of 316° C, a mold temperature of 66° C, and an injection pressure within the range of 10,000–17,000 psi, and using an A-2 type steel mold insert especially designed for mold corrosion studies. After the molding of 100 specimens from the urea-containing composition, the mold insert was examined and was found to have undergone no visible corrosion. In contrast, when specimens were molded from the glass-filled, partially cured PPS pellets, without urea, corrosion of the mold insert was visible after only 50 specimens had been molded, and moderate corrosion had occurred by the time 100 specimens had been molded.

EXAMPLE III

A composition (Composition A) consisting of urea and glass-filled, partially cured PPS in a weight ratio of 0.2:100, respectively, was prepared as follows. To a solution of 13 g of urea in 500 ml of water was added 1.5 lb. (680 g) of glass-filled, partially cured PPS pellets, and water was removed by heating the mixture under reduced pressure on a hot water bath. After drying overnight at 100°–105° C, the resulting pellets were mixed with 13.5 lb. (6124 g) of glass-filled, partially cured PPS pellets.

A composition (Composition B) consisting of urea and glass-filled, partially cured PPS in a weight ratio of 0.1:100 was prepared by the procedure used in the production of Composition A except that 6.5 g instead of 13 g of urea was used.

Specimens of Compositions A and B, as well as of the glass-filled, partially cured PPS from which Compositions A and B were prepared, were injection molded, using the equipment and conditions described in Example II. After the molding of 100 specimens from Composition A, the mold insert was examined and was found to have undergone no visible corrosion. In contrast, when specimens were molded from the glass-filled, partially cured PPS pellets, without urea, corrosion of the mold insert was visible after only 40 specimens had been molded. After the molding of 100 specimens from Composition B, corrosion and tarnish of the mold insert were visible.

EXAMPLE IV

A composition (Composition I) consisting of urea and glass-filled, partially cured PPS in a weight ratio of 0.2:100, respectively, was prepared as follows. To a solution of 22.5 g of urea in 100 ml of water was added 1 lb. (454 g) of glass-filled, partially cured PPS pellets, and water was removed by heating the mixture under reduced pressure on a hot water bath. The resulting residual product was combined with five other batches of product prepared in like manner, and the six combined batches were dried in an oven at 110° C for 4 hours. One part by weight of the dried product was then mixed with 25 parts by weight of glass-filled, partially cured PPS pellets to provide Composition I.

Composition II was prepared in the same manner as Composition I except that the resulting mixture thus obtained was then extruded and pelletized.

Specimens of Composition II were injection molded, using the equipment and conditions described in Example II. After the molding of 2000 specimens, the mold insert was examined and was found to have undergone no visible corrosion. In contrast, when the glass-filled, partially cured PPS, without urea, from which Composition II was prepared was molded under these conditions, corrosion of the mold insert was visible after only 40 specimens had been molded, as shown in Example III.

The insulation resistance of Compositions I and II, as well as that of glass-filled, partially cured PPS without urea (Control) was determined in accordance with the method of ASTM D 257-66, measuring the resistance between bolts through sheets of the plastic spaced 1¼ inches between centers. The results are summarized in Table II.

TABLE II

| Composition | Time[a] | Insulation Resistance at 60° C, ohms 95% Relative Humidity | | |
|---|---|---|---|---|
| | | Dry | 1 Day | 4 Days |
| Control | Initial | $1.5 \times 10^{11}$ | $5.8 \times 10^{10}$ | $1.1 \times 10^{11}$ |
| | 2 Mins. | | $9.2 \times 10^{10}$ | $1.3 \times 10^{11}$ |
| I | Initial | $2.0 \times 10^{11}$ | $1.0 \times 10^{11}$ | $1.2 \times 10^{11}$ |
| | 2 Mins. | | $1.2 \times 10^{11}$ | $1.4 \times 10^{11}$ |
| II | Initial | $1.6 \times 10^{11}$ | $7.2 \times 10^{10}$ | $9.1 \times 10^{10}$ |
| | 2 Mins. | | $9.3 \times 10^{10}$ | $1.1 \times 10^{11}$ |

[a]"Initial" means readings were taken within 15 seconds of the time of attachment of the ohmmeter to leads from the sample. "2 Mins." means readings were taken 2 minutes after the time of attachment of the ohmmeter to leads from the sample.

Thus, Compositions I and II, each of which contained urea, exhibited a high insulation resistance (approximately $10^{11}$ ohms), even after 4 days in an environment of high humidity, the insulation resistance being about the same as that of the Control composition containing no urea. Therefore, the presence of urea did not have a detrimental effect on the insulation resistance of glass-filled, partially cured PPS.

The foregoing description and examples have been provided to enable those skilled in the art to understand the present invention and its preferred embodiments. Obvious variations of the invention claimed below are considered to be within the scope of the claimed invention.

What is claimed is:

1. A composition of matter comprising poly(arylene-sulfide) resin and a corrosion inhibiting amount of at least one ammonia precursor having 0 to 8 carbon atoms and being selected from the group consisting of urea, monohydrocarbyl-substituted ureas, hydrazine, monohydrocarbyl-substituted hydrazines, dicarboxamides, carbamate esters, amino acids, melamine, biuret, and guanidine.

2. A composition of matter according to claim 1 wherein said at least one ammonia precursor is selected from the group consisting of urea, methylurea, isopropylurea, heptylurea, cyclohexylurea, phenylurea, p-tolylurea, hydrazine, methylhydrazine, isobutylhydrazine, octylhydrazine, cyclopentylhydrazine, phenylhydrazine, m-tolylhydrazine, succinamide, phthalamide, methyl carbamate, ethyl carbamate, isobutyl carbamate, heptyl carbamate, cyclohexyl carbamate, phenyl carbamate, o-tolyl carbamate, glycine, alanine, histidine, biuret, and guanidine.

3. A composition of matter according to claim 2 wherein the weight ratio of the total of said ammonia precursor to the poly(arylene sulfide) resin is in the range of about 0.08 to 100 to about 3 to 100.

4. A composition of matter according to claim 3 wherein said at least one ammonia precursor is selected from the group consisting of urea and monohydrocarbyl-substituted ureas.

5. A composition of matter according to claim 4 wherein said at least one ammonia precursor is urea.

6. A composition of matter according to claim 5 wherein the weight ratio of urea to the poly(arylene sulfide) resin is in the range of about 0.08 to 100 to about 3 to 100.

7. A composition of matter according to claim 6 wherein said poly(arylene sulfide) resin is a poly(phenylene sulfide) resin melting in the range of about 280° C to about 400° C.

8. A composition of matter according to claim 7 wherein said poly(phenylene sulfide) resin contains glass fiber filler in such an amount that said glass fiber filler accounts for about 20 to about 50 weight percent of the combined weights of said glass fiber and said poly(phenylene sulfide) resin.

9. A composition according to claim 7 wherein the weight ratio of urea to the poly(arylene sulfide) resin is in the range of about 0.15 to 100 to about 0.8 to 100.

10. A method for forming shaped products of normally solid poly(arylene sulfide) resin comprising (1) forming a poly(arylene) sulfide) resin composition comprising poly(arylene sulfide) resin and a corrosion inhibiting amount of at least one ammonia precursor having 0 to 8 carbon atoms and being selected from the group consisting of urea, monohydrocarbyl-substituted ureas, hydrazine, monohydrocarbyl-substituted hydrazines, dicarboxamides, carbamate esters, amino acids, melamine, biuret, and guanidine, and (2) molding said poly(arylene sulfide) resin composition.

11. A method according to claim 10 wherein said at least one ammonia precursor is selected from the group consisting of urea, methylurea, isopropylurea, heptylurea, cyclohexylurea, phenylurea, p-tolylurea, hydrazine, methylhydrazine, isobutylhydrazine, octylhydrazine, cyclopentylhydrazine, phenylhydrazine, m-tolylhydrazine, succinamide, phthalamide, methyl carbamate, ethyl carbamate, isobutyl carbamate, heptyl carbamate, cyclohexyl carbamate, phenyl carbamate, o-tolyl carbamate, glycine, alanine, histidine, biuret, and guanidine.

12. A method according to claim 11 wherein the weight ratio of the total said ammonia precursor to the poly(arylene sulfide) resin is in the range of about 0.05 to 100 to about 2 to 100.

13. A method according to claim 12 wherein said ammonia precursor is selected from the group consisting of urea and monohydrocarbyl-substituted urea.

14. A method according to claim 10 wherein said ammonia precursor is urea.

15. A method according to claim 14 wherein the weight ratio of urea to the poly(arylene sulfide) resin is in the range of about 0.08 to 100 to about 3 to 100.

16. A method according to claim 14 wherein said poly(arylene sulfide) resin is a poly(phenylene sulfide) resin melting in the range of about 280° C to about 400° C.

17. A method according to claim 16 wherein said composition of said poly(phenylene sulfide) resin and urea is obtained by impregnating the poly(phenylene sulfide) resin with a solution of the urea in a volatile solvent, followed by evaporation of the solvent.

18. A method according to claim 17 wherein the weight ratio of urea to the poly(phenylene sulfide) resin is in the range of about 0.15 to 100 to about 0.8 to 100.

19. A method according to claim 17 wherein said poly(phenylene sulfide) resin composition is molded at a temperature in the range of about 280° C to about 400° C.

20. A method according to claim 19 comprising the injection molding of the poly(phenylene sulfide) resin composition.

21. A method according to claim 20 wherein the weight ratio of urea to the poly(phenylene sulfide) resin is in the range of about 0.15 to 100 to about 0.8 to 100.

22. A method according to claim 21 wherein said poly(phenylene sulfide) resin composition further contains about 20 to about 50 weight percent based on the weight of said poly(phenylene sulfide) resin of glass fiber filler.

23. A method according to claim 14 comprising the injection molding of the poly(arylene sulfide) resin composition.

24. A method according to claim 12 comprising the injection molding of the poly(arylene sulfide) resin composition.

* * * * *

UNITED STATES PATENT AND TRADEMARK OFFICE
CERTIFICATE OF CORRECTION

PATENT NO. : 4,115,344
DATED : September 19, 1978
INVENTOR(S) : Donnie G. Brady

It is certified that error appears in the above-identified patent and that said Letters Patent are hereby corrected as shown below:

Column 6, line 28, delete "poly(arylene-" and insert therefor --- poly(arylene ---;

Column 7, line 9, delete "poly(arylene)" and insert therefor --- poly(arylene ---; and Column 7, line 21, delete "p-tolyurea," and insert therefor --- p-tolylurea, ---.

Signed and Sealed this

Sixth Day of February 1979

[SEAL]

Attest:

RUTH C. MASON
Attesting Officer

DONALD W. BANNER
Commissioner of Patents and Trademarks